M. R. JOHNSON.
NONSKID CHAIN.
APPLICATION FILED JULY 21, 1921.
1,423,564.
Patented July 25, 1922.
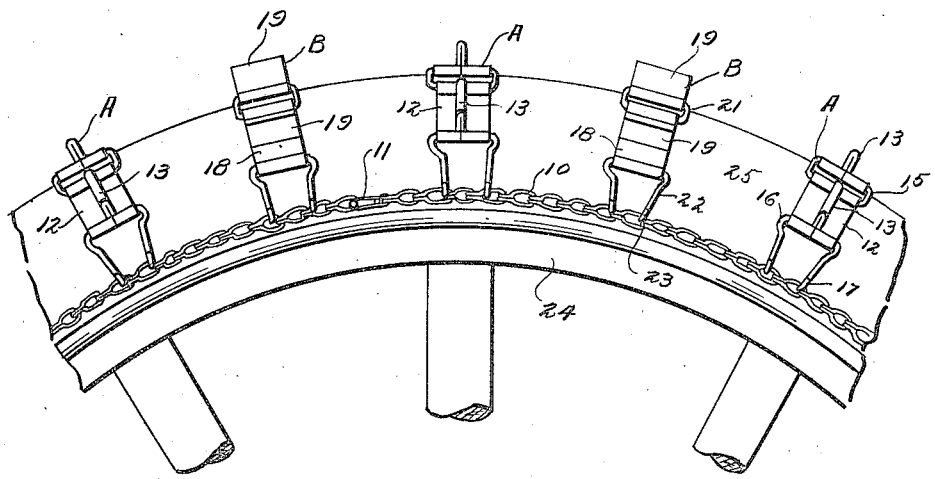
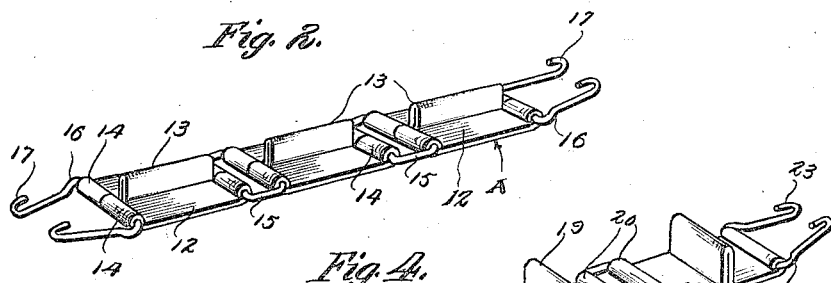
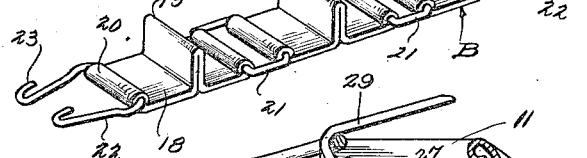
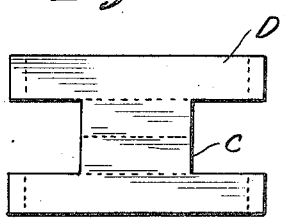
Inventor
M. R. Johnson.
By Lacey & Lacey, Attorneys

UNITED STATES PATENT OFFICE.

MORRISON R. JOHNSON, OF BRAYMER, MISSOURI.

NONSKID CHAIN.

1,423,564.   Specification of Letters Patent.   Patented July 25, 1922.

Application filed July 21, 1921. Serial No. 486,339.

*To all whom it may concern:*

Be it known that I, MORRISON R. JOHNSON, citizen of the United States, residing at Braymer, in the county of Caldwell and State of Missouri, have invented certain new and useful Improvements in Nonskid Chains, of which the following is a specification.

This invention relates to an improved non-skid chain for motor vehicles and has as one of its principal objects to provide a device of this character which will furnish effective traction and which will, at the same time, minimize side slipping.

A further object of the invention is to provide a chain having transversely disposed calks to provide a purchase for the drive wheels of the vehicle so that spinning of the wheels will be minimized and wherein the chain will further be equipped with circumferentially disposed calks or, in other words, calks at right angles to the first calks, for preventing side slipping.

A still further object of the invention is to provide a device wherein the calks will be carried by cross chains and wherein the calks will be formed as an integral part of the links of the cross chains.

And the invention has as a still further object to provide a device which will be well adapted for general use.

Other and incidental objects will appear hereinafter.

In the drawings:

Figure 1 is a fragmentary side elevation of my improved chain,

Figure 2 is a perspective view showing one of the cross chains in detail,

Figure 3 is a plan view showing a typical blank from which the calk links of the cross chain of Figure 2 are constructed, Figure 4 is a perspective view showing another of the cross chains in detail, and Figure 5 is a detail section showing the type of latch employed in connection with the side chains of the device.

Referring now more particularly to the drawing, I employ companion side chain members 10, each of which is detachably connected at its ends by an appropriate latch. As will be observed upon reference to Figure 5, the latch is preferably formed of suitable sheet metal bent into substantially channel shape to form sides 11 and extending between said sides near one end of the latch is a cross pin 26 with which one end of the chain is engaged. In advance of said pin the bottom wall of the latch is bent up and then again directed downwardly to form a depending spring catch 27 and extending between the sides of the latch adjacent its opposite end is a pin 28 upon which is mounted to swing a bent lever 29, the free end of which is adapted to engage with the catch 27. Thus, the opposite end of the chain may be engaged with the lever when by swinging the lever to coact with the catch, the chain will be drawn taut while the lever will be secured for securing the chain at its ends. Extending between said side chains is a plurality of cross chains. These cross chains differ in their construction somewhat, the cross chains of one construction being indicated as a whole at A and the cross chains of the other construction being indicated as a whole at B. As will be observed, the chains A and B preferably alternate, the chains A being designed to provide driving traction while the chains B are designed to prevent side slipping.

As shown in Figure 2, each of the chains A comprises a plurality of links 12. These links are each formed from a blank of the character shown in Figure 3. The blank is preferably stamped from suitable resilient sheet metal and comprises a body C from which project pairs of lugs D, the blank being H-shape in general contour. The body C of the blank is folded along a medial line to provide an upstanding longitudinally directed calk 13, the folding of the body causing the lugs D to be brought together in abutting relation. The ends of these lugs are then rolled to provide alined hinge loops 14 at each end of the link. Connecting the several links 12 are links 15 extending through the adjacent loops 14 of the former links, and extending through the hinge loops at the free ends of the terminal links 12 are split links 16 provided at their ends with hooks 17 engaged with the side chains 10 for securing the cross chains thereto.

Referring now to the cross chains B, it will be seen that each of these chains includes, as shown in detail in Figure 4, a plurality of calk links 18. These links, like the links 12, are also preferably constructed of suitable resilient sheet metal folded medially to provide upstanding transversely disposed calks 19 while the ends of the links are rolled to provide hinge loops 20. Connecting the several links 18 are links 21 extending through the adjacent loops 20 of the former links and extending through the loops at the free ends of the terminal links 18 are split links 22 provided at their ends with hooks 23 engaged with the side chains 10. Thus, as will be seen, the chains A and B are securely connected to the side chains while, should it be found necessary, any one of the cross chains may be detached and renewed.

In Figure 1 of the drawing, I have shown the invention in connection with an ordinary motor vehicle wheel 24 and tire 25. As is usual, the chains 10 extend at opposite sides of the tire while the chains A and B extend transversely across the tread of the tire. Accordingly, as will be seen, the calks 13 of the chains A will lie transversely with respect to the direction of rotation of the wheel and will thus bite or dig into the ground to provide effective traction for the wheel and prevent spinning thereof. On the other hand, the calks 19 of the cross chains B will be supported at right angles to the calks 13 and will engage the ground to prevent side slipping of the wheel. I accordingly provide a non-skid chain of highly efficient construction.

Having thus described the invention, what is claimed as new is:

In a non-skid chain, the combination of side members, cross chains between the members respectively comprising a plurality of links each formed from a sheet metal blank folded upon itself to define overlapping portions providing an upstanding traction rib and bent at its ends to form pairs of companion hinge loops, and other links extending through said pairs of loops pivotally connecting the first links with each other and with the side members as well as limiting the overlapping portions of the first links against spreading.

In testimony whereof I affix my signature.

MORRISON R. JOHNSON. [L. S.]